United States Patent [19]

Jackson

[11] Patent Number: 5,393,418
[45] Date of Patent: Feb. 28, 1995

[54] WATER INTAKE, IN PARTICULAR FOR INDUSTRIAL INSTALLATIONS

[75] Inventor: Philip Jackson, Paris, France

[73] Assignee: E. Beaudrey & Cie, Paris, France

[21] Appl. No.: 912,713

[22] Filed: Jul. 13, 1992

[30] Foreign Application Priority Data

Jul. 24, 1991 [FR] France ................ 91 09372

[51] Int. Cl.⁶ ........................................ B01D 35/02
[52] U.S. Cl. ................................. 210/159; 210/162; 210/170; 210/258; 210/413; 210/416.1; 210/460
[58] Field of Search ............ 210/460, 170, 154, 416.1, 210/416.2, 416.3, 242.2, 242.1, 162, 159, 173, 174, 393, 413, 415, 258; 417/423.3

[56] References Cited

U.S. PATENT DOCUMENTS

| | | | |
|---|---|---|---|
| 857,519 | 6/1907 | Foster | 210/460 |
| 1,070,788 | 8/1913 | Elliott | 210/460 |
| 1,909,578 | 5/1933 | Franke | 210/242.1 |
| 1,954,824 | 4/1934 | Mendenhall et al. | 417/423.3 |
| 2,045,442 | 6/1936 | Couch | 210/26 |
| 2,106,851 | 2/1938 | Nordell | 210/162 |
| 2,358,841 | 9/1944 | Walker | 210/162 |
| 2,361,231 | 10/1944 | Nebolsine | 210/170 |
| 2,827,268 | 3/1958 | Staaf | 210/242.1 |
| 2,860,835 | 11/1958 | Schade | 210/174 |
| 3,348,686 | 10/1967 | Spitzer | 210/416.2 |
| 3,476,038 | 11/1969 | Dicmas | 210/242.1 |
| 3,581,903 | 6/1971 | Holz | 210/415 |
| 3,735,873 | 5/1973 | Bergstedt | 210/415 |
| 4,137,177 | 1/1979 | Shoda | 210/393 |
| 4,276,171 | 6/1981 | Jackson | 210/437 |
| 4,392,952 | 7/1983 | Fechter et al. | 210/170 |
| 4,618,419 | 10/1986 | Hollinsheand et al. | 210/460 |
| 4,622,148 | 11/1986 | Willinger | 210/416.2 |
| 4,713,179 | 12/1987 | Goedderz, Sr. | 210/170 |
| 4,761,226 | 8/1988 | Creps | 210/416.1 |
| 4,779,682 | 10/1988 | Pelzer | 210/170 |
| 4,822,486 | 4/1989 | Wilkins et al. | 210/416.1 |
| 4,898,513 | 2/1990 | Hon | 210/416.1 |
| 4,966,532 | 10/1990 | Fengsheng | 417/423.3 |
| 4,966,534 | 10/1990 | Hasslen, III | 417/423.3 |
| 4,981,420 | 1/1991 | Jensen et al. | 417/423.3 |
| 5,069,796 | 12/1991 | Fox | 210/170 |
| 5,154,588 | 10/1992 | Freet et al. | 417/423.3 |

FOREIGN PATENT DOCUMENTS

| | | | |
|---|---|---|---|
| 2355544 | 6/1981 | France . | |
| 2542042 | 9/1984 | France . | |
| 2617912 | 1/1989 | France . | |
| 973094 | 12/1959 | Germany | 210/416.1 |
| 63-107714 | 5/1988 | Japan | 210/416.1 |

*Primary Examiner*—Cynthia L. Nessler
*Attorney, Agent, or Firm*—Young & Thompson

[57] ABSTRACT

A water intake comprises a common frame and assembled thereto and-forming therewith an integral self-contained unit a pump adapted to be immersed and a trash rake and an associated grid on the suction side of the pump and/or a filter on the discharge side of the pump.

12 Claims, 1 Drawing Sheet

WATER INTAKE, IN PARTICULAR FOR INDUSTRIAL INSTALLATIONS

BACKGROUND OF THE INVENTION

1. Field of the invention The present invention concerns water intakes and more particularly, but not exclusively, water intakes for industrial installations.

2. Description of the prior art

Water intakes of this kind are relatively complex screening and pumping stations which in their most complete form comprise a grid, usually made up of bars and with which is usually associated a trash rake, a filter, usually a chain or drum rotary filter, the ancillary units usually associated with a rotary filter of this kind and a pump which is usually an immersed vertical axis pump whose drive motor is usually above the water.

At present they are usually installed in a relatively large and deep masonry structure requiring relatively difficult civil engineering works because at least some of the works are executed below water level and in the underlying water table.

Although such civil engineering works are virtually unavoidable for water intakes capable of high unit flow-rates, in the order of at least several cubic meters per second, for example, they would appear to be redundant and costly for smaller capacity water intakes.

A general object of the present invention is to provide a water intake Which gives satisfaction at reduced cost in such cases.

SUMMARY OF THE INVENTION

The present invention consists in a water intake comprising a common frame and assembled thereto and forming therewith an integral self-contained unit a pump adapted to be immersed and a trash rake and an associated grid on the suction side of said pump and/or a filter on the discharge side of said pump.

In a preferred embodiment of the invention, the pump may advantageously be disposed at the lower end of a hollow shaft which, if a filter is used, carries the filter at its upper end and provides a conduit between the pump and the filter.

A water intake in accordance with the invention constitutes a screening and pumping station as previously, although in a particularly compact form, and because it is self-contained it can advantageously be installed with no or with significantly reduced civil engineering works.

For example, it may easily be attached to a quay, at its edge, to a barge, to a wharf, to a mooring post or even to posts erected in the water.

The features and advantages of the present invention will emerge from the following description given by way of example only and with reference to the appended diagrammatic drawings.

DETAILED DESCRIPTION OF THE INVENTION

Figure 1:
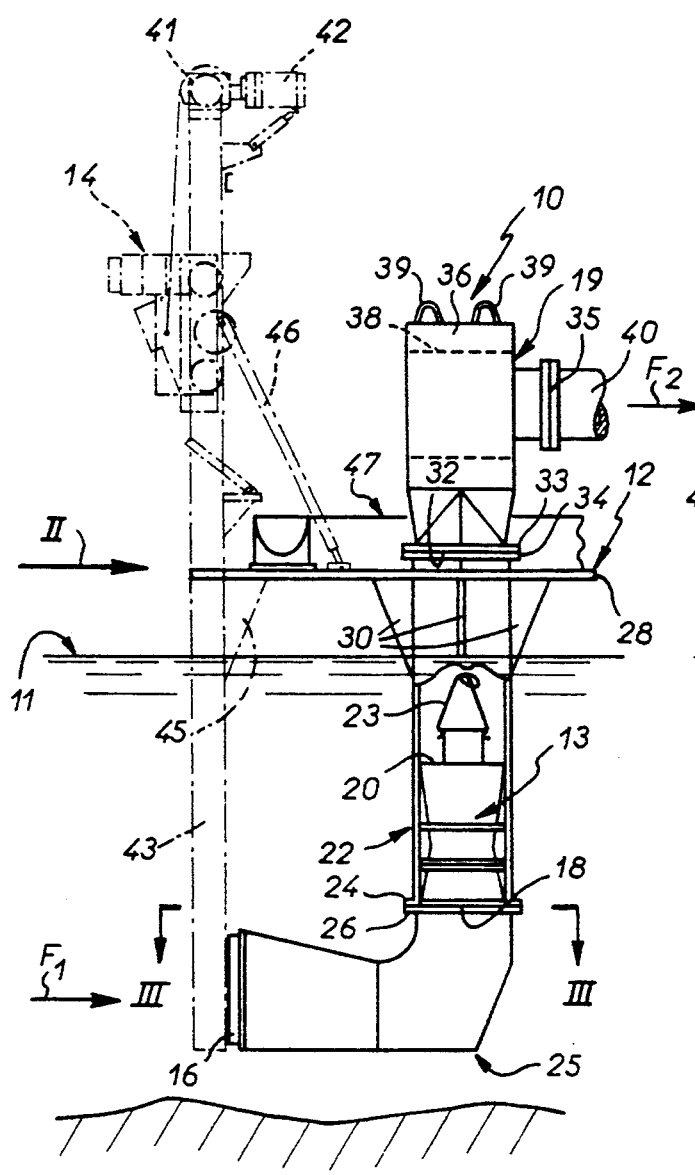
FIG. 1 is a locally cut away view in elevation of a water intake in accordance with the invention as seen in the direction of the arrow I in FIG. 3.
Figure 2:
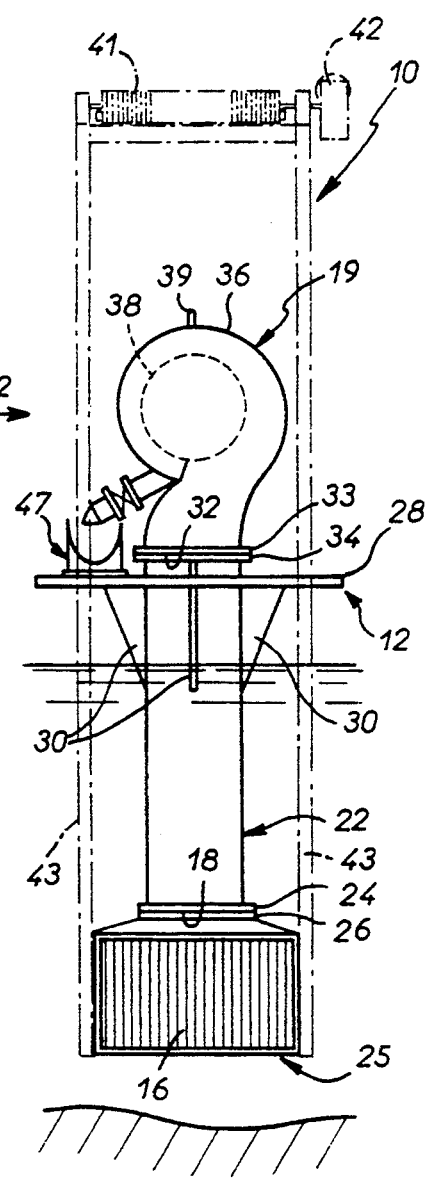
FIG. 2 is a side view of it as seen in the direction of the arrow II in FIG. 1.
Figure 3:
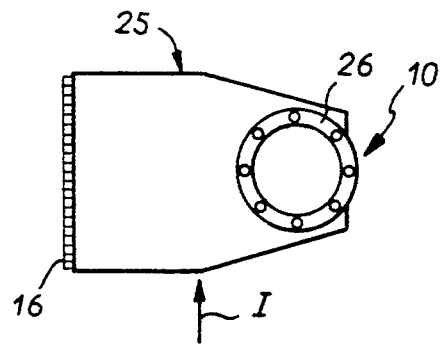
FIG. 3 is a partial plan view of it on the line III—III in FIG. 1.

The water intake 10 is designed to be installed in any body of water 11. It comprises, assembled onto a common frame 12 and constituting therewith an integral and self-contained unit, a pump 13 adapted to be immersed in the water and a trash rake 14 for a grid 16 fitted to the suction side 18 of the pump 13 and/or a filter 19 on the discharge side 20 of the pump 13.

The pump 13 is disposed at the lower end of a hollow shaft 22 which is part of the frame 12. When a filter 19 is used, as in the embodiment shown, the upper end of the shaft 22 carries the filter 19 and the shaft provides a conduit between the pump 13 and the filter 19.

As the pump 13 is not in itself relevant to the present invention it will not be described here.

Suffice to say that it is an axial flow submersible pump, for example, slung from a lifting ring 23 and lowered into the shaft 22 until it rests on an inside shoulder formed at its base by a flange 24 provided for this purpose. A lug projecting from the shoulder locates the pump in the angular direction relative to the shaft 22 and prevents it from rotating relative to the shaft.

The shaft 22 is extended downwardly by an intake elbow bend 25 connected to it by a flange 26 and at the end of which is located the grid 16.

The shaft 22 is vertical and attached to a platform 28 which, like it, is part of the frame 12 and is intended to remain underwater.

The shaft 22 passes through the platform 28 and projects slightly above it.

It is joined to the platform 28 by a plurality of triangular stiffener ribs 30 equi-angularly spaced below the platform 28.

The filter 19 is mounted directly to the end of the shaft 22.

To this end it has at its inlet 32 a flange 33 by means of which it is attached to a flange 34 provided for this purpose at the upper end of the shaft 22.

As the filter 19 is not in itself relevant to the present invention it will not be described in detail here.

Suffice to say that it is a filter with a side inlet 32 and an axial outlet 35 of the type described in French patent 2 355 544, for example.

The filter 19 includes a fixed screen 38 mounted off-center in a body 36 with a spiral-shape side wall.

The filter 19 has lifting rings 39 on the top.

An evacuation pipe 40 is connected to its outlet 35.

The grid 16 is a .grid made up of bars and is associated with a trash rake 14 diagrammatically represented in chain-dotted outline in FIG. 1.

As the trash rake 14 is well known in itself and is not in itself relevant to the present invention it will not be described here.

Suffice to say that it is movable on two parallel uprights 43 by a winch 41 driven by a motor 42. The uprights 43 are attached to the intake elbow bend 25 and the grid 16 at their lower end. They are attached in the middle to the bottom of the platform 28 by triangular stiffener ribs 45 and to the top of the platform 28 by struts 46, if required.

The platform 28 carries a collection trough or basket 47 for collecting debris from the trash rake 14 and from the filter 19.

Water drawn in by the pump 13 enters through the grid as shown by the arrow F1 in FIG. 1. The screened water exits the filter 19 as shown by the arrow F2 in FIG. 1.

The hollow shaft 22 supports the pump 13, provides a conduit between the latter and the filter 19 and supports the filter 19.

Of course, the present invention is not limited to the embodiment described and shown but encompasses any variant execution thereof.

In particular, apart from the motor driving the trash rake, if used, the water intake in accordance with the invention may be totally immersed.

Also, instead of being entirely vertical as specifically described and shown, it may be more or less inclined and/or articulated to enable it to be raised.

Furthermore, instead of being rigidly fastened to a fixed or floating support, it may be articulated to a support.

There is claimed:

1. A self-contained water intake assembly of unitary construction installable as a unit in a body of flowing water, said water intake assembly comprising a common frame including a substantially vertically hollow shaft, said hollow shaft having an upper and a lower end and defining a water flow conduit, an axial flow immersible pump unit mounted at the lower end of said shaft and housed substantially entirely therein for pumping water from the lower end to the upper end of said shaft, a self-cleaning filter mounted at and fluidly connected to the upper end of said shaft, an intake opening disposed at the lower end of said shaft upstream of said pump unit, a grid fitted within said intake opening, and a trash rake mounted on the common frame and extending parallel to said shaft, said trash rake engaging said grid, and said trash rake providing means for cleaning said grid.

2. Water intake assembly according to claim 1, wherein the immersible pump unit is entirely disposed within the conduit.

3. Water intake assembly according to claim 1, wherein said common frame comprises a platform, said hollow shaft being fixed to the platform.

4. Water intake assembly according to claim 3, wherein the conduit, platform and filter are entirely immersible.

5. Water intake assembly according to claim 3, wherein said hollow shaft passes through the platform.

6. Water intake assembly according to claim 5, wherein said platform is disposed at a level slightly above the surface of the body of water.

7. Water intake assembly according to claim 3, wherein said filter has a side inlet which is axially 8. Water intake assembly according to claim 7, wherein said conduit extends through the platform and the connection between the conduit and the filter is above the level of the platform.

9. Water intake assembly according to claim 7, wherein said conduit has an extension from the lower end, said extension defining the intake opening fitted with the grid.

10. Water intake assembly according to claim 9, wherein the extension comprises an intake elbow bend.

11. Water intake assembly according to claim 10, wherein the trash rake is carried by the platform.

12. Water intake assembly according to claim 11, further comprising a pair of uprights fixed to the platform and supporting said trash rake.

* * * * *